US009086492B2

(12) United States Patent
Zhang et al.

(10) Patent No.: US 9,086,492 B2
(45) Date of Patent: Jul. 21, 2015

(54) CONCURRENT DC-COUPLED ANODE AND DYNODE READOUT SCHEME FOR PET BLOCK DETECTORS

(75) Inventors: Nan Zhang, Knoxville, TN (US); Matthias J. Schmand, Lenoir City, TN (US); Niraj K. Doshi, Knoxville, TN (US); Michael D. Loope, Louisville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 441 days.

(21) Appl. No.: 11/753,067

(22) Filed: May 24, 2007

(65) Prior Publication Data

US 2008/0290282 A1 Nov. 27, 2008

(51) Int. Cl.
*G01T 1/00* (2006.01)
*G01T 1/164* (2006.01)

(52) U.S. Cl.
CPC .................................. *G01T 1/1642* (2013.01)

(58) Field of Classification Search
USPC ........................................................ 250/369
See application file for complete search history.

(56) References Cited

U.S. PATENT DOCUMENTS

| | | | |
|---|---|---|---|
| 3,011,057 A | | 11/1961 | Anger |
| 3,089,959 A | * | 5/1963 | Chatten .......................... 250/207 |
| 3,136,902 A | * | 6/1964 | Kerns .............................. 327/77 |
| 3,721,824 A | * | 3/1973 | Bristol ........................... 250/369 |
| 3,984,689 A | * | 10/1976 | Arseneau ....................... 250/369 |
| 4,292,597 A | * | 9/1981 | Niimura et al. ................ 330/254 |
| 4,929,835 A | * | 5/1990 | Yamashita et al. ............. 250/367 |
| 4,931,649 A | * | 6/1990 | Czirr et al. ................ 250/390.07 |

OTHER PUBLICATIONS

Zhang et al. Anode position and last dynode timing circuits for dual-layer BGO scintillator with PS-PMT based modular PET detectors, IEEE Transactions on Nuclear Science, vol. 49, No. 5 (Oct. 2002), pp. 2203-2207.*
Hamamatsu Photomultiplier tubes Basics and applications, 2nd Edition (1999), pp. 14 and 175.*
Bengtson et al. Timing improved by the use of dynode signals studied with different scintillators and photomultipliers, Nuclear Instruments and Methods in Physics Research, vol. 204, No. 1 (Dec. 1982), pp. 129-140.*

* cited by examiner

*Primary Examiner* — David Porta
*Assistant Examiner* — Shun Lee
(74) *Attorney, Agent, or Firm* — Peter Kendall

(57) ABSTRACT

A scintillation detector including one or more photomultiplier tubes, a scintillation block optically attached to the photomultiplier tubes, and a DC-coupled bleeder circuit combining outputs of dynodes of the photomultipliers to provide a DC-coupled dynode output together with a DC-coupled anode output of the photomultiplier tubes. The DC-coupled bleeder circuit includes a RF transformer. A positive high voltage supply also can be used together with a DC-coupled bleeder circuit for the anode outputs.

20 Claims, 7 Drawing Sheets

CONCURRENT DC-COUPLED ANODE AND DYNODE READOUT SCHEME FOR PET BLOCK DETECTORS

TECHNICAL FIELD

The current invention relates to the field of nuclear medical imaging systems electronics. Particularly, the invention relates to detector signal readout techniques.

BACKGROUND OF THE INVENTION

Medical imaging is one of the most useful diagnostic tools available in modern medicine. Medical imaging allows medical personnel to non-intrusively look into a living body in order to detect and assess many types of injuries, diseases, conditions, etc. Medical imaging allows doctors and technicians to more easily and correctly make a diagnosis, decide on a treatment, prescribe medication, perform surgery or other treatments, etc.

There are medical imaging processes of many types and for many different purposes, situations, or uses. They commonly share the ability to create an image of a bodily region of a patient, and can do so non-invasively. Examples of some common medical imaging types are nuclear medical (NM) imaging such as positron emission tomography (PET) and single photon emission computed tomography (SPECT), electron-beam X-ray computed tomography (CT), magnetic resonance imaging (MRI), and ultrasound (US). Using these or other imaging types and associated machines, an image or series of images may be captured. Other devices may then be used to process the image in some fashion. Finally, a doctor or technician may read the image in order to provide a diagnosis.

A conventional "block" detector utilizes a 2×2 array of photomultiplier tubes (PMTs) to identify a gamma-ray scintillation event within a pixilated scintillation crystal block by computing the position of the incident gamma-ray from a logical combination of PMT output signals. FIG. 1 shows a basic block detector design using four PMTs 110 (A, B, C and D) to compute the location of a scintillation event within crystal block 100.

In conventional timing readout for PET-based PMT systems, wherein coincidence must be detected between a pair of oppositely traveling gamma-rays produced from the annihilation of a positron, the total energy signal from the PMT array is used for signal timing purposes. This is shown in FIG. 2, wherein the anode (A) outputs of the four PMTs A, B, C and D are summed to obtain an energy signal E (also sometimes denoted as Z). The summing amplifier (not shown) typically has to be a very high bandwidth, low noise amplifier with low input capacitance.

FIG. 2 illustrates the HV resistor network of the prior art configuration, wherein, using conventional "Anger" logic (see U.S. Pat. No. 3,011,057 to Anger, issued Nov. 28, 1961 and incorporated herein by reference) the total energy of a gamma-ray event is calculated as E=A+B+C+D, and the X and Y spatial coordinates are calculated as:

$$X = \frac{(A+B)-(C+D)}{E} \text{ and } Y = \frac{(A+C)-(B+D)}{E}$$

Generally, the signal timing is obtained from the energy signal E through known constant fraction discriminator (CFD) circuits. The timing resolution will be determined by the rise-time, signal-to-noise ratio, and the input capacitance of the signal E. It is difficult to obtain a good timing signal from summing the anode outputs A, B, C and D because the anode outputs must be split into two branches, one for obtaining the energy signal E and the other for obtaining the position coordinates X and Y.

Baseline shift creates another problem found in AC-coupled circuitry correlated with signal count-rate. Baseline shift may be caused by charge buildup in isolating capacitors. AC-coupling systems usually overcome this problem by implementing baseline-restore software or hardware, which may increase costs.

Therefore, there exists a need in the art to improve detector timing performance, reduce baseline shift and simplify timing readout electronics.

SUMMARY

Therefore, provided is a scintillation detector including one or more photomultiplier tubes, a scintillation block optically attached to the photomultiplier tubes, and a DC coupled bleeder circuit combining outputs of dynodes of the photomultipliers. The DC coupled bleeder circuit includes a RF transformer.

Further provided is a positron emission tomography (PET) system that includes a PET scanner, one or more photomultiplier tube attached to the PET scanner, a scintillation block optically attached to the photomultiplier tubes, a DC coupled bleeder circuit combining outputs of dynodes of the photomultipliers, and a processor for receiving outputs from the DC coupled bleeder circuit. The DC coupled bleeder circuit includes a RF transformer.

BRIEF DESCRIPTION OF EXEMPLIARY EMBODIMENTS

The invention will now be described in greater detail in the following by way of example only and with reference to the attached drawings, in which.

DETAILED DESCRIPTION OF THE INVENTION

As required, disclosures herein provide detailed embodiments of the present invention; however, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

Initially, it is explained that photomultipliers are constructed from a glass vacuum tube that houses a photocathode, one or more dynodes, and an anode. Incident photons strike the photocathode material that is present as a thin deposit on the entry window of the photomultiplier tube, with electrons being produced as a consequence of the photoelectric effect. These electrons are directed by a focusing electrode towards an electron multiplier, which consists of a number of electrodes called dynodes, where the number of electrons are multiplied by the process of secondary emission.

Each dynode is held at a more positive voltage than the previous one, such that as the electrons leave the photocathode with the energy of the incoming photon, they are accelerated towards the first dynode by the electric field and arrive at the first dynode with much greater energy. On striking the first dynode, more low energy electrons are emitted and these, in turn, are accelerated by the electric field towards the second dynode. The result is that a cascade occurs with an increasing number of electrons being produced at each dynode stage, until the anode is reached where the accumulation of electric charge results in a sharp current pulse indicating the arrival of a photon at the photocathode.

Figure 3:
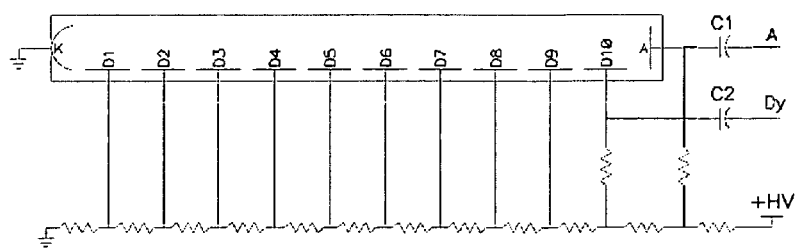
FIG. 3 shows simplified conventional bleeder circuit with positive high voltage supply for a PMT.

FIG. 3 shows a simplified conventional bleeder circuit with positive high voltage supply for a PMT. In this circuit, the anode output A and the dynode output Dy are both AC coupled because the voltage potential of the anode is around the input voltage HV, which is generally over 1000 volts, and the voltage potential of the dynode is around HV−100V.

Figure 4:
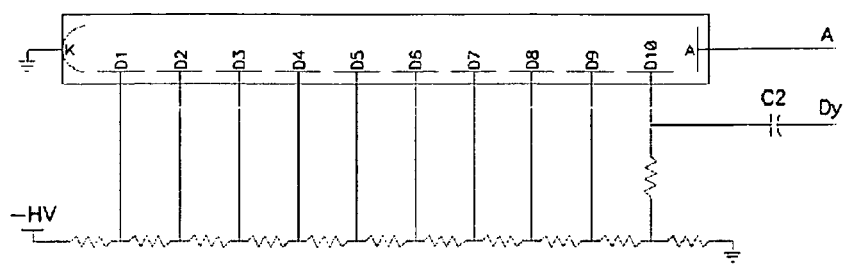
FIG. 4 shows an additional known bleeder circuit with negative high voltage supply.

FIG. 4 shows another known bleeder circuit. Instead of the positive HV power supply (as shown in FIG. 3), this circuit uses a negative high voltage power supply −HV. Anode output A can be DC coupled. However, the dynode output Dy has to be AC coupled because of the approximately −100V potential.

Figure 1:
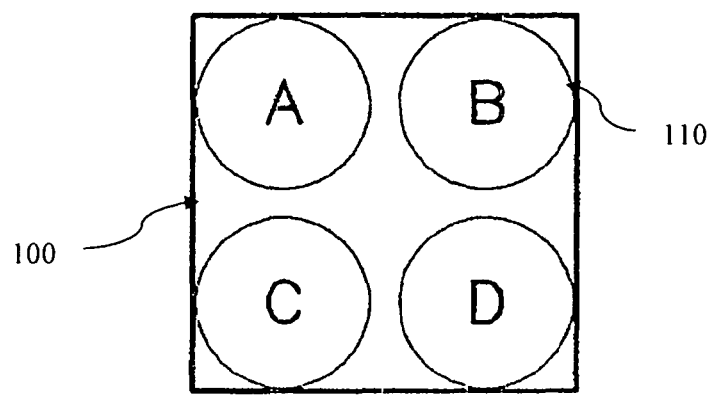
FIG. 1 shows a prior art 2×2 "Anger Logic" block detector.
Figure 2:
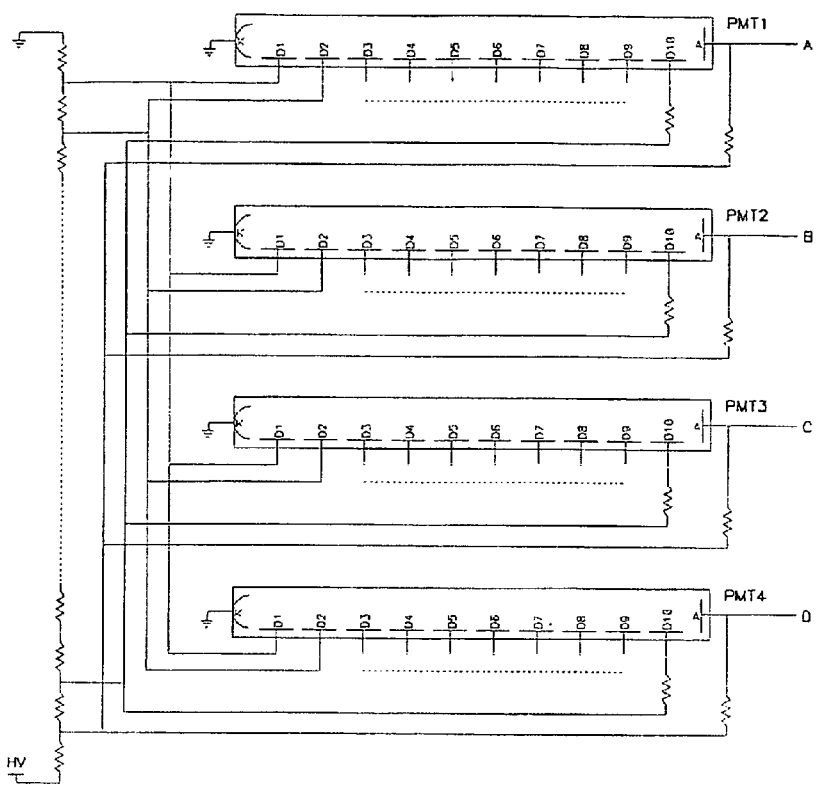
FIG. 2 shows a prior art HV network arrangement where the anode outputs of PMTs are used to determine the energy signal E, which is also used to obtain a timing signal.

The bleeder circuits shown in FIGS. 1 and 2 are some of the most popular configurations for PET scanners, as well as TOF (time-of-flight) PET systems. Neither PET system, however, uses the Dy outputs.

Figure 5:
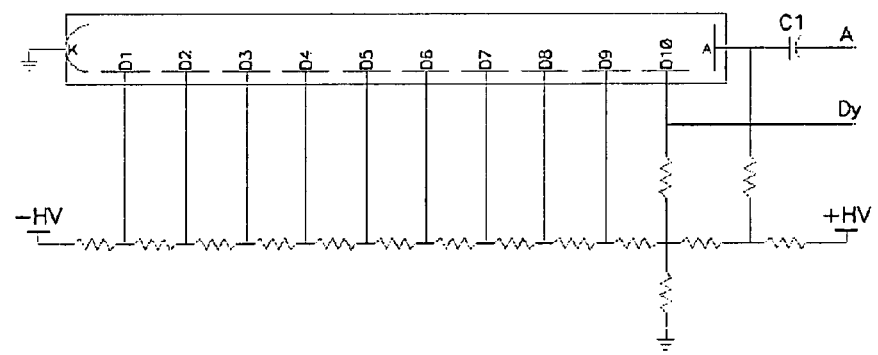
FIG. 5 shows a known DC-coupled dynode output bleeder circuit.

FIG. 5 shows another known bleeder circuit that has a DC-coupled dynode output Dy. However, in such a circuit, even though the dynode output may be DC-coupled, the anode output A still has to be AC-coupled. Additionally, such a circuit has to have two high voltage power supplies, −HV and +HV, which increases costs and circuitry complexity. This type of circuit is rarely seen in commercial PET systems.

Figure 6:
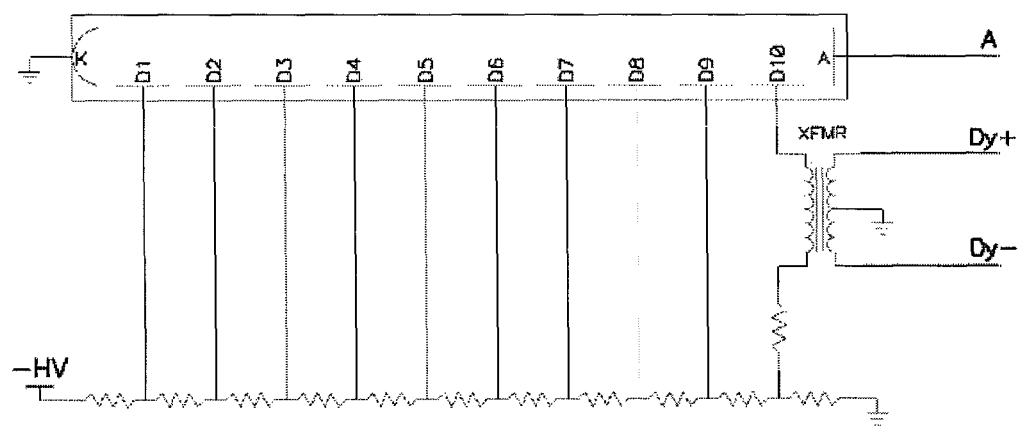
FIG. 6 shows a DC coupled bleeder circuit for both anode and dynode outputs in accordance with one embodiment of the present invention.

FIG. 6 shows an embodiment of a DC-coupled bleeder circuit in accordance with an embodiment of the present invention. In accordance with an embodiment of the invention, each of the anode and dynode outputs is DC-coupled. A miniature RF transformer XFMR is applied to the last dynode of the PMT (D10 in the embodiment shown, however any number of dynodes may be used). RF transformer XFMR may be any device capable of transferring energy from one circuit to another by electromagnetic induction. A regular RF transformer can withstand 300V between its primary and secondary windings, however custom transformers can be constructed to withstand over 1000V if necessary. Using RF transformer XFMR, and a negative high voltage supply −HV, a DC-coupled anode A and dynode Dy output may be obtained simultaneously. Additionally, differential dynode outputs Dy+ and Dy− may allow RF transformer XFMR to easily convert signals from single-ended to true differential without adding noise. Dy output may be configured as a single-ended output.

While FIG. 6 shows a single PMT used in a bleeder circuit, any number of PMTs can be connected to a single bleeder network to bias the tubes.

Figure 7:
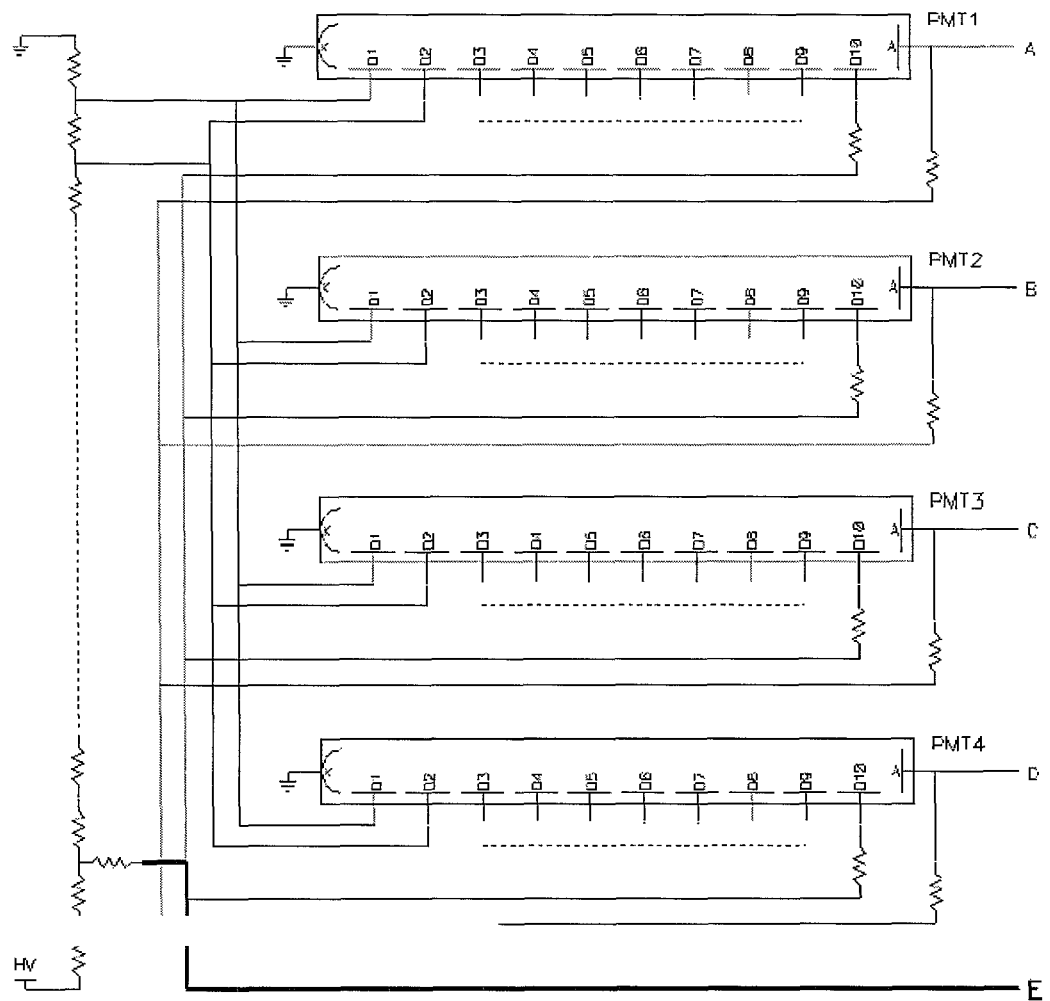
FIG. 7 shows a prior inventive circuit by the present inventors, in which the signals A, B, C, and D from a bleeder circuit are used for energy and position calculations, while dynode outputs are used for timing signal generation.

FIG. 7 illustrates another circuit in accordance with a prior invention of the present inventors, wherein anode outputs A, B, C and D are used for event energy and position calculations, while the last dynodes (i.e., the last dynode stage before the anode) are connected together to obtain a timing signal. As compared with obtaining an energy signal E by summing together outputs of the PMT anodes, the dynode outputs have less noise, lower input capacitance, no signal-splitting for separate spatial coordinate computation, and are potentially faster because they are not constrained by the bandwidth limits of the anode summing amplifiers. However, since A, B, C, D, and E are all at the high-voltage potential, these signals have to be AC coupled to subsequent circuits.

Figure 8:
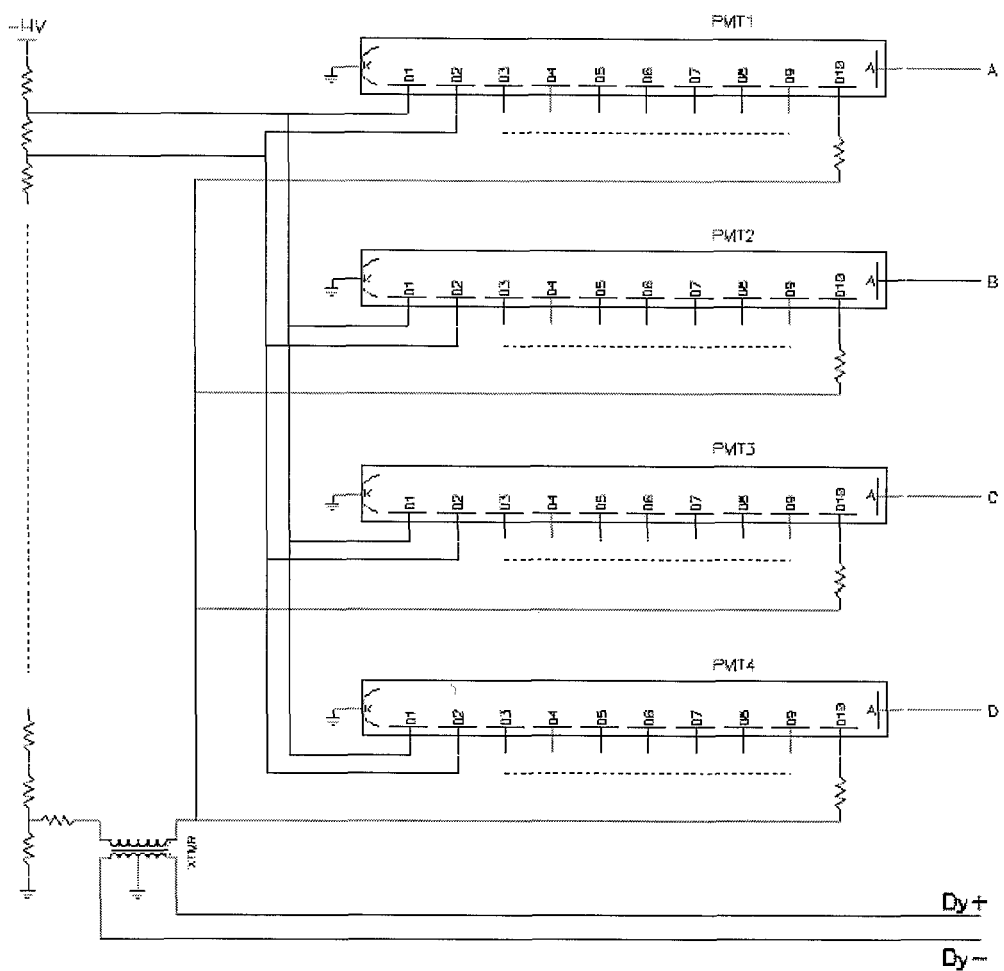
FIG. 8 shows the bleeder circuitry of another embodiment of the present invention, in which the anode outputs A, B, C, and D and dynode output Dy+ and Dy− can all be DC-coupled to subsequent process circuitry.

FIG. 8 shows a bleeder circuit of another embodiment of the present invention, wherein anode outputs A, B, C, and D and dynode outputs Dy+ and Dy− from the last dynodes of the PMTs all may be DC-coupled to subsequent processing circuitry. While this embodiment is shown with four PMTs for explanatory purposes, any number of PMTs can be used. This configuration may eliminate baseline shift, and achieve higher accuracy in position, energy and timing without requiring complex baseline-restoration processes.

Figure 9:
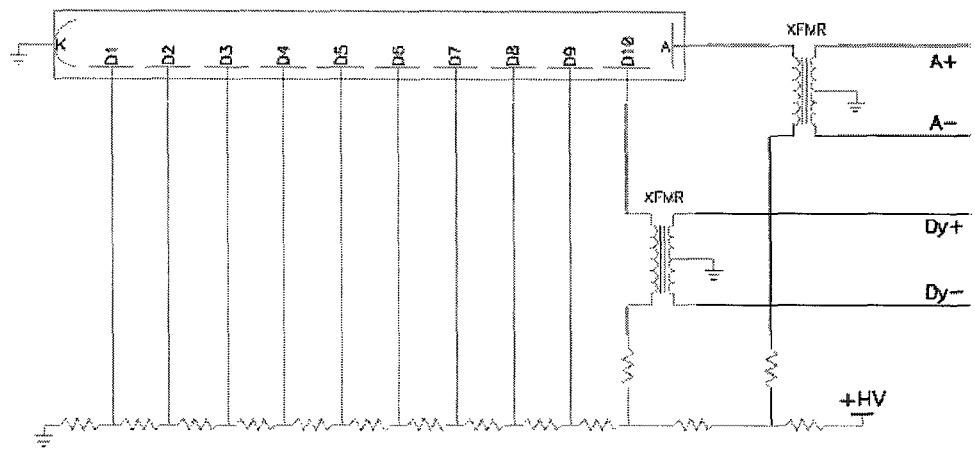
FIG. 9 shows a further embodiment of the invention for a single PMT wherein the concurrent DC-coupled anode and dynode readout scheme can be easily implemented for bleeder circuits with positive high-voltage power supplies.
Figure 10:
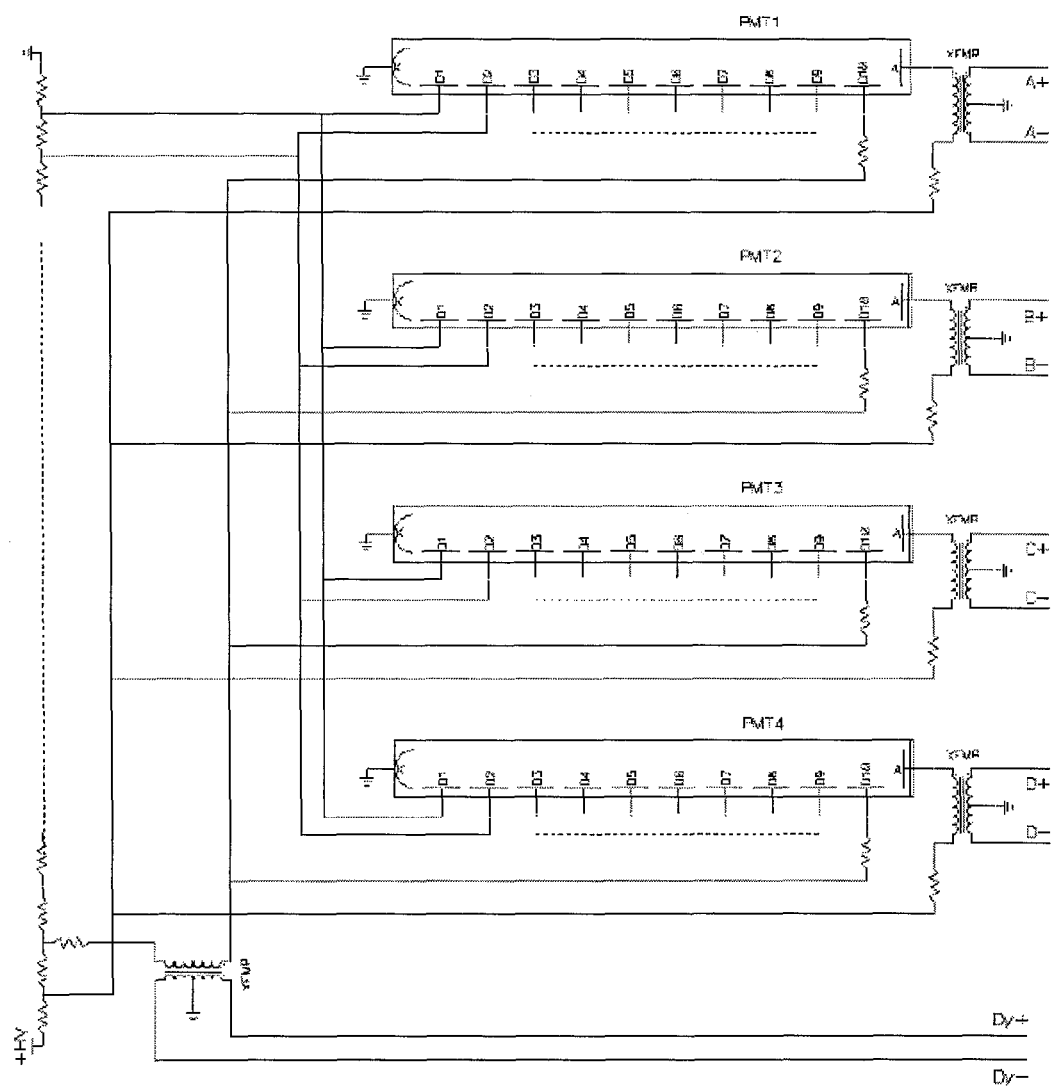
FIG. 10 shows a possible setup for a block detector with four PMTs using the scheme shown in FIG. 9.

FIGS. 9 and 10 demonstrate how the present DC-coupled anode and dynode readout scheme can be implemented for bleeder circuits with positive high-voltage power supplies. FIG. 9 shows a configuration for a single PMT, while FIG. 10 shows an embodiment for a block detector with four PMTs. While FIG. 10 shows four PMTs, any number of PMTs could be used. Such configurations can be used in many different applications. This technique can also be used to DC couple the anodes for a bleeder circuit with positive HV power supply when a dynode output is not required.

Although various embodiment of the invention having been thus described, it will be apparent to those skilled in the art that the same may be varied in many ways without departing from the spirit of the invention. Any and such modifications are intended to be covered within the scope of the following claims.

What is claimed is:

1. A scintillation detector, comprising:
   at least one photomultiplier tube having a plurality of dynodes and an anode;
   a scintillation block optically coupled to the at least one photomultiplier tube;
   a DC-coupled anode output; and
   a bleeder circuit providing a DC-coupled dynode output from at least one of said dynodes,
   wherein the DC-coupled anode output and the DC-coupled dynode output are obtained simultaneously.

2. The scintillation detector of claim 1, wherein said at least one dynode is a last stage dynode of said at least one photomultiplier tube.

3. The scintillation detector of claim 1, wherein the bleeder circuit comprises a RF transformer.

4. The scintillation detector of claim 3, wherein the RF transformer is a miniature RF transformer.

5. The scintillation detector of claim 3, wherein the RF transformer is adapted to withstand at least 1000V.

6. The scintillation detector of claim 3, further comprising a negative high voltage supply coupled to said at least one photomultiplier tube.

7. The scintillation detector of claim 1, wherein said at least one photomultiplier tube includes a plurality of photomultiplier tubes, wherein said bleeder circuit combines dynode outputs from said plurality of photomultiplier tubes to provide a combined DC-coupled dynode output.

8. The scintillation detector of claim 7, wherein said bleeder circuit provides said DC-coupled anode output as a combination of anode signals from said plurality of photomultiplier tubes and provides a positive high voltage supply.

9. The scintillation detector of claim 8, wherein said bleeder circuit comprises a RF transformer.

10. The scintillation detector of claim 1, wherein said bleeder circuit provides said DC-coupled anode output and provides a positive high voltage supply.

11. The scintillation detector of claim 10, wherein said bleeder circuit comprises a RF transformer.

12. The scintillation detector of claim 1, wherein the dynode output is configured as a pair of differential dynode outputs.

13. The scintillation detector of claim 1, wherein the dynode output is configured as a single-ended dynode output.

14. The scintillation detector of claim 1, wherein said DC-coupled dynode output is used to generate a scintillation event timing signal.

15. A PET block scintillation detector, comprising:
a plurality of photomultiplier tubes each having a plurality of dynodes and a single anode;
a scintillation block optically coupled to said plurality of photomultiplier tubes;
a negative high voltage supply coupled to said plurality of photomultiplier tubes;
a DC-coupled anode output of a combination of anode outputs of said plurality of photomultiplier tubes; and
a bleeder circuit providing a DC-coupled dynode output from a combination of dynode outputs of said plurality of photomultiplier tubes,
wherein the DC-coupled anode and the DC-coupled dynode output are obtained simultaneously.

16. The PET block scintillation detector of claim 15, wherein said bleeder circuit comprises a RF transformer.

17. The PET block scintillation detector of claim 15, wherein said DC-coupled dynode output is a differential output configuration.

18. A PET block scintillation detector, comprising:
a plurality of photomultiplier tubes each having a plurality of dynodes and a single anode;
a scintillation block optically coupled to said plurality of photomultiplier tubes;
a positive high voltage supply coupled to said plurality of photomultiplier tubes;
a first bleeder circuit, independent of dynode voltage divider circuitry of said photomultiplier tubes, providing a DC-coupled anode output from a combination of anode outputs of said plurality of photomultiplier tubes; and
a second bleeder circuit providing a DC-coupled dynode output from a combination of dynode outputs of said plurality of photomultiplier tubes,
wherein the DC-coupled anode output and the DC-coupled dynode output are obtained simultaneously.

19. The PET block scintillation detector of claim 18, wherein said first and second bleeder circuits comprise RF transformers.

20. The PET block scintillation detector of claim 18, wherein said DC-coupled dynode output is a differential output configuration.

* * * * *